United States Patent [19]

Dvorak

[11] 3,991,796

[45] Nov. 16, 1976

[54] WIRE CUTTING, STRIPPING AND WRAPPING HAND TOOL

[75] Inventor: Jaroslav Dvorak, Ringwood, N.J.

[73] Assignee: O.K. Machine and Tool Corporation, New York, N.Y.

[22] Filed: Dec. 22, 1975

[21] Appl. No.: 643,352

[52] U.S. Cl. .............................. 140/124; 29/203 H; 242/7.06
[51] Int. Cl.² ...................... B21F 3/00; B21F 15/04
[58] Field of Search ........ 7/14.1 R; 29/33 F, 203 H, 29/203 HM; 81/9.5 R, 9.5 A; 140/122, 124; 242/7.06, 7.17

[56] References Cited
UNITED STATES PATENTS

| | | |
|---|---|---|
| 1,250,328 | 12/1917 | Langford .............................. 145/62 |
| 2,682,063 | 6/1954 | Miloche ......................... 242/7.06 X |
| 2,807,810 | 10/1957 | Belek et al. ..................... 242/7.06 X |
| 3,378,906 | 4/1968 | Dorsey ............................ 140/124 X |
| 3,619,829 | 11/1971 | Finn et al. ....................... 140/124 X |
| 3,695,309 | 10/1972 | Finn ..................................... 140/124 |
| 3,803,649 | 4/1974 | Skutt et al. .......................... 7/14.1 R |

*Primary Examiner*—C.W. Lanham
*Assistant Examiner*—E. M. Combs

[57] ABSTRACT

A manual operated insulated wire, cutting, stripping and wrapping tool comprises an elongated, generally cylindrical body comprising at a working end a stripping and wrapping head and at the opposite end a handle on which is mounted a wire cutter operated by rotating an intermediate sleeve against a restoring force over a limited arc relative to the handle.

7 Claims, 10 Drawing Figures

U.S. Patent  Nov. 16, 1976  Sheet 1 of 2  3,991,796
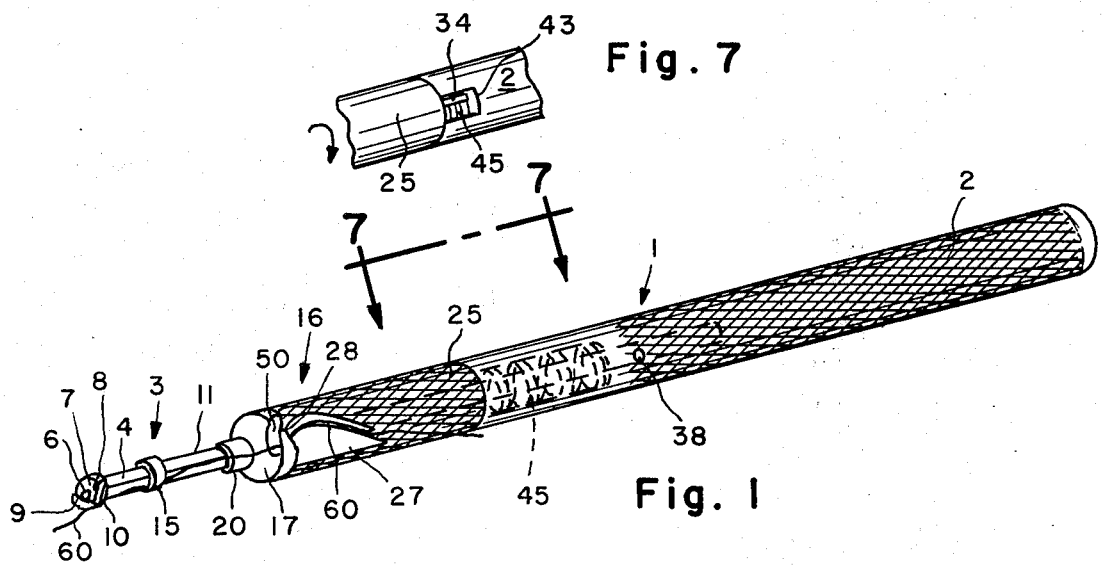
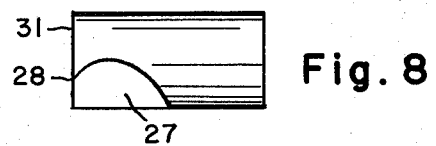
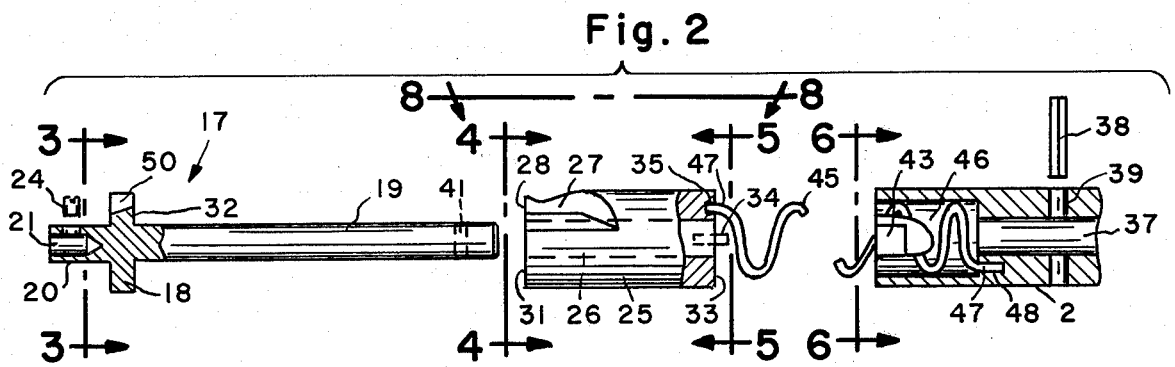
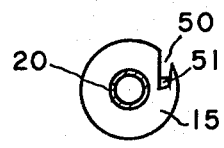
Fig. 3
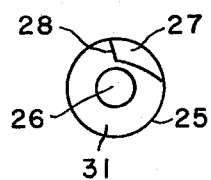
Fig. 4
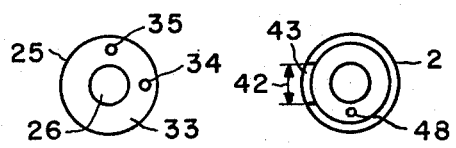
Fig. 5  Fig. 6

WIRE CUTTING, STRIPPING AND WRAPPING HAND TOOL

This invention relates to a manual or hand tool for cutting insulated electrical wire to a predetermined length, and while wrapping the wire around an electrical terminal stripping the insulation from the free end of the wire to effect an electrical connection between the terminal and the wrapped wire.

Pneumatic and electrically driven power tools are widely used in production work for making wire wrapped connections to electrical terminals. In most instances, the wire insulation is pre-stripped before wrapping a pre-cut wire on the terminal. However, power tools are commercially available which can automatically perform all three functions. See for instance U.S. Pat. Nos. 2,807,810 and 3,378,048, which illustrate two forms of what are known as power cut, strip and wrap tools.

Manual or hand-operated wrapping tools are useful for service and repair work. As a single function wrapping tool, they are commercially available in the form of an elongated body of simple cylindrical shape. However, handoperated, three-function, cut, strip and wrap tools are considerably more complicated and bulky, and also require the continuous use of both hands for operating the tool. Examples of such tools are described in British patents Nos. 1,216,465 and 1,285,695.

A principal object of the invention is a manual or hand-operated cut, strip and wrap tool characterized by a simple, compact, readily-assembled construction easily operated primarily by one hand.

This and other objects of the invention are reailized by a cut, strip and wrap tool construction wherein the wire cutter comprises fixed and rotatable elements defining a slot for receiving the wire whereby relative rotation of the cutter elements causes cutting of the wire. The fixed cutter element is secured to the stripping and wrapping head which in turn is secured to the handle. Only limited rotatable motion is permitted between the two cutter elements, and when that limit is reached, release of either element causes return of the elements to their initial, wire-receiving position. Afterwards, simple rotation of the handle and thus the entire tool wll bring about wrapping of the cut wire around the terminal while the insulation is stripped.

Among the features of the invention are a novel construction of the wire cutter mechanism and its mounting on the handle which allows configuring the tool to have a uniformly cylindrical handle construction allowing for easy handling by the operator in a manner similar to the known single-function, hand wrapping tool, and at the same time permits the operator an unobstructed view of the terminal during the wire-wrapping process.

These and other features and advantages of the invention will best be understood from the following detailed description of several preferred embodiments in accordance with the invention wherein:

FIG. 1 is a perspective view of one preferred embodiment of a cut, strip and wrap tool in accordance with the invention;

FIG. 2 is an exploded view of the tool of FIG. 1 except for the strip and wrap head;

FIG. 3 is a cross-sectional view aong 3—3 of the tool illustrated in FIG. 2;

FIGS. 4–6 are end views along the lines 4—4, 5—5, and 6—6, respectively, of parts of the tool illustrated in FIG. 2;

FIG. 7 is a partial side view of the tool illustrated in FIG. 1 illustrating the stop mechanism for the rotatable cutter element;

FIG. 8 is a top view along the line 8—8 part of the tool illustrated in FIG. 2;

Figure 9:
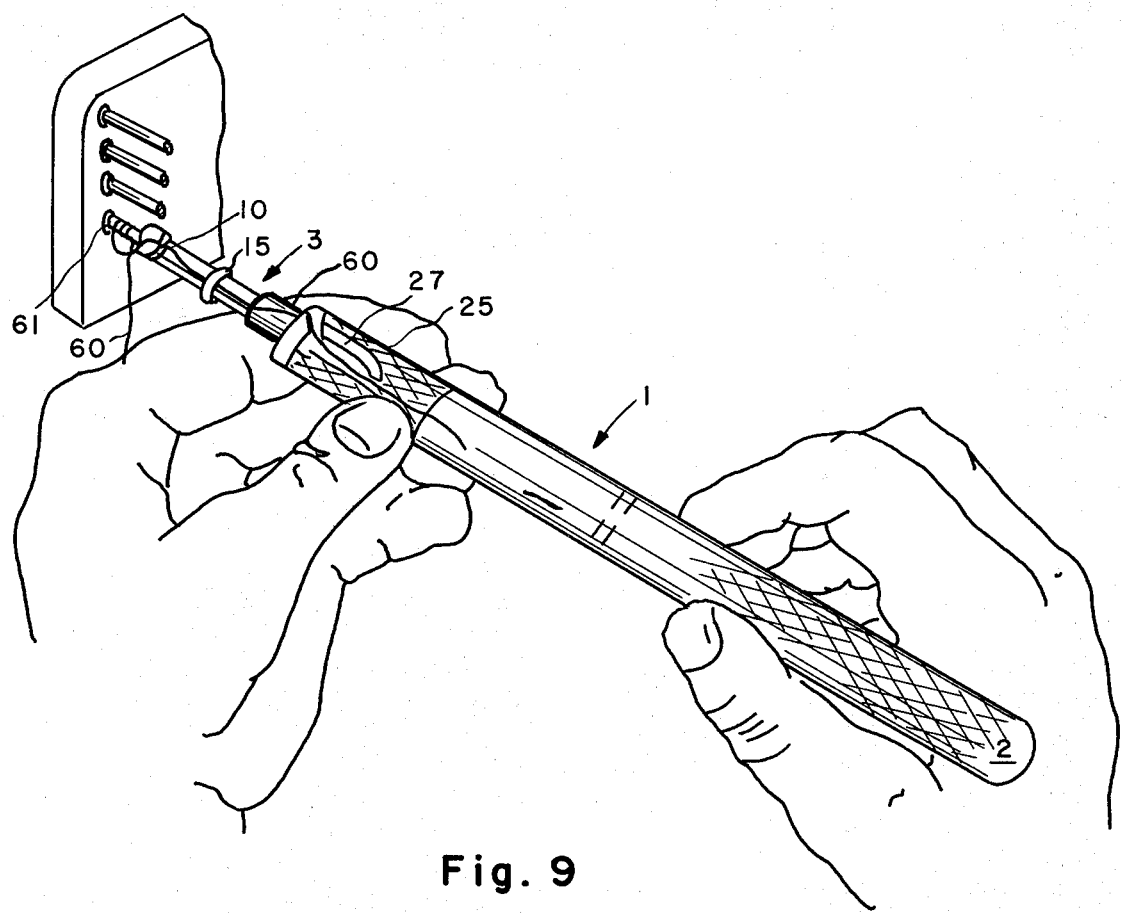
FIG. 9 is a perspective view illustrating use of the tool of FIG. 1.

Referring now to FIGS. 1–8, a preferred embodiment of the tool of the invention comprises an elongated body 1 having a handle end 2 of uniformly cylindrical shape on which is mounted a working end 3 comprising a strip and wrap head 4. The strip and wrap head 4 may be of conventional construction comprising at the end a bore 6 for receiving the terminal about which the wire is to be wrapped, which bore is surrounded by structure for wrapping the wire around the terminal, one form of which comprises or end face 7 having a rounded edge 8 about which the wire is pulled, to prevent damaging the wire, and a step 9 which serves to bend the wire end as it leaves the stripping slot to complete the wrapping condition. Adjacent the wrapping structure is insulation stripping means comprising a slot 10 defined by cutting edges sized to accommodate the metal core of the wire but not its insulation, so that when the wire is forced into the slot, the cutting edges slice through the insulation. Extending further back along the head is a wire guide 15 having an opening through which the wire is threaded. The head portion includes a shank 1 which is mounted on the handle 2. Where the shank 11 adjoins the handle 2 is mounted a wire cutter 16.

The wire cutter 16 comprises two relatively rotatable elements forming a wire-shearing mechanism. In the form shown, a fixed element 17 is constituted by an enlarged collar 18 located intermediate a shank portion 19 for mounting to the handle 2 and a front projecting portion 20 on which the working end 3 is mounted. The front projection portion 20 comprises a bore 21 for receiving the shank 11 of the strip and wrap head 4. The latter is secured in fixed relation to the cutter element 17 as for example by means of a set screw 24 threadingly engaging the wal of the bore 21 and engaging and locking to the shank 11 of the strip and wrap head. As will be appreciated, the strip and wrap head 4 is thus easily replaced by another head to handle different sized wires or terminals.

The rotatable element of the wire cutter 16 is constituted by a sleeve 25 having a hollow bore 26 through which the shank 19 of the fixed cutter element 17 passes. The forward end of the sleeve 25 is cut away 27, as by milling, to form a cutting edge 28 designed to shear a fixed wire extending along the tool top adjacent the edge when the rotatable element 25 is rotated clockwise in the view of FIG. 4 (counterclockwise when viewed from the end of the handle).

The front surface 31 of the sleeve 25 fits closely against and bears against the rear surface 32 of the collar 18. The rear surface 33 of the collar 25 contains a pin 34 fixed thereto and which protrudes parallel to the tool axis. Also present on this rear surface 33 is a hole 35.

The collar 25 abuts against the handle 2, which has a central narrow bore 37 for receiving the shank 19 of the cutter element 17. The shank 19 is fixed to the handle 2 as, for example, by way of a friction pin 38 which passes through a radial hole 39 in the handle barrel and an aligned radial hole 41 in the shank 22. Thus, the fixed cutter element 17 is secured to the handle 2, and the sleeve 25 is rotatable about the shank 19 and thus relative to the fixed element 17. The rotation is however limited to the short arc designated in FIG. 6 by numeral 42, which is obtained by cutting a slot 43 in the facing wall of the handle 2 for receiving the pin 34 protruding from the rear face of the sleeve 25. The slot walls stop or limit the rotation of the sleeve 25 relative to the handle 2 (see FIG. 7). Means are provided to urge the sleeve 25 into its most clockwise position. These means take the form of a spring 45 which is seated in an enlarged bore 46 in the front end of the handle 2. The spring 45 has axially projecting ends 47 which are received in non-aligned holes, one 35 in the sleeve 25, and one 48 at the bottom of the cavity 46. The spring retaining holes 35, 48 are circumferentially displaced such that when the tool is assembled, the spring 45 is tensioned producing a restoring force tending to rotate the sleeve 25 clockwise with respect to the handle 2 (viewed from the right-hand end in FIG. 1). Thus, when the handle 2 is kept fixed, and the sleeve 25 is rotated counterclockwise over the short arc 42, and then released, the spring 45 will restore the sleeve 25 to its original or stable position as illustrated in FIG. 7.

The collar 18, is fixed cutter element, is provided with a tangentially-directed slot 50 extending from its rim inward (FIG. 3). The slot 50 has a width to accommodate the insulation-covered wire. The bottom of the slot is tapered 51 toward the collar side facing the rotatable sleeve forming a sharp edge. When the tool is assembled, the slot 50 is positioned adjacent the cut-away section 27 of the sleeve 25 with the cutting edge 28 located adjacent and aligned with the left-hand side (FIG. 3) of the wire-receiving slot 50. When a wire is positioned in the slot 50 and extends along the cut-away section 27 of the sleeve, rotation of the sleeeve causes the cutting edge 28 to bear against the wire forcing it down against the adjacent sharp edge at the slot taper 51. Imparting additional force cause the wire to shear at the cutting edge 28. The shearing mechanism is very efficient due to the juxtaposed sharp edges, and the small leverage afforded by the small diameter sleeve is more than sufficient to provide rapid and easy cutting of all common sized electronic wires.

To assemble the tool of the invention, one simply slides the sleeve 25, spring 45, and handle 2 on the shank 19, then slips the spring ends 47 into their respective holes 35, 48 while aligning the pin 34 within its cooperating stop slot 43, aligns the holes 39, 41 tensioning the spring 45, and then drives the friction pin 38 through the aligned holes. Next, the desired strip and wrap head 4 is mounted in the projection 20, the wire guide aperture aligned with the cutter slot 50, and the set screw 24 tightened down.

In operation (see FIG. 9), the operator grasps with his right hand the handle 2 of the tool, and then with his left hand threads the free end of an insulated wire 60 from, for example, a supply reel or from an adjacent terminal into the cutting slot 50 and cut-out section 27, and then into the wire guide 15 on the head 4, and finally pushes the wire into the stripping slot 10, cutting through its insulaton.

Next, as illustrated in FIG. 9, the operator pushes the tool 1 onto the terminal 61, which engages the head bore 6, and with his left hand grasps the knurled rotatable cutter sleeve 25 and rotates it counterclockwise relative to the tool handle in his right hand over the short arc as illustrated in FIG. 6, thereby cutting off the free end of the wire extending along the handle rearward of the cutter slot 50. Then, the operator removes his left hand from the tool, which automatically realigns the cutter slot 50 and cut-out section 27, and, if the wire is from a supply reel or is not restrained, as by a tension bar or the like on the reel, or as a result of being fixed to another terminal, grasps the wire with his left hand and simply rotates clockwise with his right hand the tool handle 2, which causes rotation of the entire tool 1 including the head 4 causing the insulation to be stripped as the wire is pulled through the stripping slot 10 and wrapped around and in good electrical connection with the terminal 61. The longitudinal spacing between the stripping 10 and cutting slots 50 determines the length of bare wire and the number of wire turns on the terminal. When the wrapping is completed, the tool is removed from the terminal, the stripped insulation discarded, and the tool is ready for another cut, strip and wrap cycle. Note that the operator uses only one hand during most of the operation because the entire tool is rotated during the performance of the strip and wrap functions. The operator's second hand is needed only during the cut operation, and thus is free and available for holding the wire if necessary during the strip and wrap operations.

Figure 10:
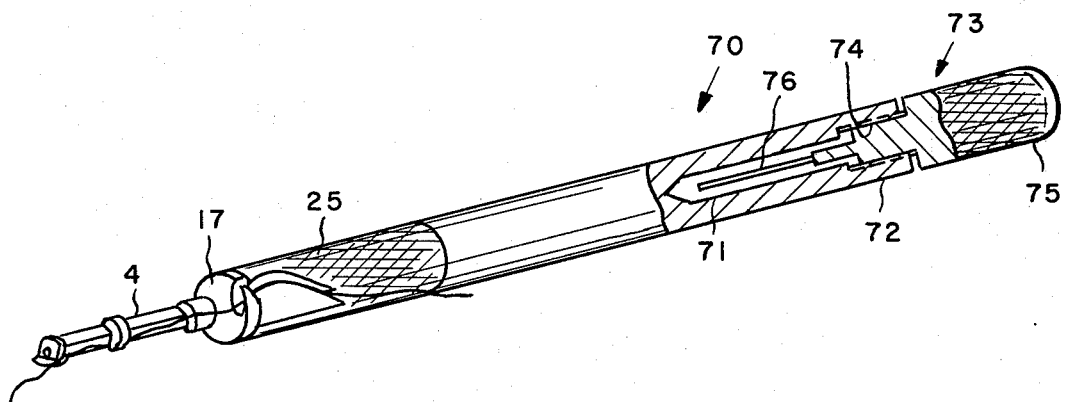
FIG. 10 is a perspective view of a modification.

A feature of the invention is the simple cylindrical configuration of the tool enabling easy operation. Its uncomplicated construction compared with the prior art, especially at the handle end, makes available the additional advantage of affording storage space in the handle for convenient accessories for a cut, strip and wrap tool. One such accessory which is most useful in service and repair work is a hand-operated, wire unwrap tool to remove defective connections. FIG. 10 illustrates a second embodiment of the invention which is similar to that illustrated in FIGS. 1–8 except that its handle 70 has been modified to incorporate an unwrap tool. To this end, a central bore 71 is provided at the end opposite to the working end, the bore 71 terminating in a threaded opening 72 engaging an unwrap tool 73 which is also of elongated form having a central threaded section 74, a handle portion 75 at one end, and a known unwrap tip 76 at the opposite end. As will be observed, the unwrap tool 73 can be stored in the handle 70 of the cut, strip and wrap tool by simply screwing it into the end, maintaining the uniform cylindrical shape of the tool for ease of use as a cut, strip and wrap tool. When needed, the unwrap tool 73 can simply be screwed out of the handle 70 and used as desired, and replaced in its storage compartment after use.

The hand tool of the invention offers a number of advantages over the known tools. As will be noted from the description of the preferred embodiments, relatively few parts are needed to make up the tool, the parts are not unduly complicated, and assembly is simple and rapid. Thus manufacturing cost is low. Yet, the tool construction is sturdy and highly efficient in performing the three functions required. Operation of the tool is simple to learn and, except for threading of the wire and operation of the cutter, quite similar to that of the known, single-function, hand tool. Hence, even unskilled operators will encounter little difficulty in mastering its use and aquiring speed and dexterity in its use. Both hands need be used only during the short time interval when the wire is cut; thereafter the entire tool can be held and rotated by one hand of the operator for the wrap and strip operations. Speed of operation is also enhanced by the automatic return and realignment of the wire holding slot in the cutter for easy and quick threading of a new wire for a subsequent cut, strip and wrap operation. The simple elongated, small-diameter, cylindrical tool configuration makes for a light-weight tool, easily grasped in the operator's hand, and which is compact and can be readily carried in a tool holster or even a shirt pocket. The absence of large radial projections affords the operator an unobstructed view of the terminal during the cut, strip and wrap operations preventing or reducing improper or poorly wrapped connections.

While the tool of the invention has been described in connection with one form of strip and wrap head, it is understood that the precise nature of same is not a crucial part of this invention, and other constructions or configurations usable commercially in power cut, strip and wrap tools or described in the present invention literature referenced earlier can be substituted for the one described in this applicaton. Also, the roles of the fixed and rotatable cutter elements can be interchanged. For instance, the cutter edge 28 can be located on the fixed collar 18, and the wire-holding slot 50 located on the rotatable sleeve 25 to cause shearing of the wire as it is rotated past the cutting edge 28, though the construction illustrated in FIG. 1 is preferred. Still further, the pin 34 and slot 43 sleeve rotation stop, while preferred, can be replaced by equivalent means. Also, it can even be eliminated by substituting the natural stop force of the spring itself. Thus, by substituting a stronger spring, the spring resistance itself can provide a natural limit to excess rotation of the sleeve 25.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A hand-operated tool for cutting insulated wire, stripping insulation from a portion thereof, and wrapping the stripped portion on a terminal, comprising an elongated member comprising a generally cylindrical handle end having a central bore, an elongated shank having one end engaging the handle bore and secured to the handle for rotation therewith, a strippng and wrapping head including insulation stripping means for receiving the insulated wire and for cutting through the insulation whereby when the wire is pulled through the stripping means during the wrapping process the cut insulation is stripped from the wire, said head further including wire wrapping means comprising a bore for receiving the terminal and means adjacent the bore for wrapping the wire around the terminal when said head is rotated, means securing the stripping and wrapping head to the opposite end of the elongated shank, and a wire cutting mechanism, said wire cutting mechanism comprising a fixed element and a rotatable element together aligned to form an exposed cutting slot for receiving the insulated wire and cooperating when the rotatable element is rotated relative to the fixed element to shear through the wire when placed in the cutting slot, said fixed cutter element comprising an enlarged collar on the elongated shank located between its ends, said rotatable cutter element comprising a sleeve rotatably mounted on the elongated shank between and adjacent the said enlarged collar and the cylindrical handle, said sleeve being located in a position to be gripped by a user, and means providing a restoring force to realign the position of the fixed and rotatable cutting elements after they have been rotated relative to one another, the restoring force means comprising a spring mounted within a cavity of the tool and having one end secured to the rotatable sleeve and the other end secured to the handle.

2. A hand-operated tool as claimed in claim 1 wherein the handle end comprises a straight cylindrical member having a uniform diameter along its length, said enlarged collar and rotatable sleeve having the same uniform diameter as that of the handle end.

3. A hand-operated tool as claimed in claim 2 and further comprising an unwrap tool mounted in a bore in the handle end and having an exposed end of the same uniform diameter as that of the handle end.

4. A tool as claimed in claim 2 wherein the wire receiving slot is provided on said enlarged collar, said rotatable sleeve has a cut-out section adjacent the collar forming a cutting edge, and said sleeve bears against both the collar and the handle.

5. A hand-operated tool as claimed in claim 2 wherein the spring is mounted in an enlarged cavity of the handle, and the means for securing the spring ends comprises an axially projecting end of the spring engaging a hole in the sleeve and handle respectively, said spring-engaging holes being circumferentially displaced relative to one another.

6. A hand-operated tool as claimed in claim 5 wherein means are provided for limiting the rotatable motion of the sleeve, said limiting means comprising a pin and a cooperating slot located on the facing surfaces of the rotatable sleeve and the handle.

7. A hand-operated tool as claimed in claim 1 wherein the fixed cutter element is provided with a forward projection for removably receiving and holding the stripping and wrapping head.

* * * * *